United States Patent
Hsu

(10) Patent No.: US 11,573,610 B2
(45) Date of Patent: Feb. 7, 2023

(54) ROTARY SHAFT LINK ASSEMBLY STRUCTURE

(71) Applicant: FIRST DOME CORPORATION, New Taipei (TW)

(72) Inventor: An Szu Hsu, New Taipei (TW)

(73) Assignee: Fositek Corporation, New Taipei (TW)

( * ) Notice: Subject to any disclaimer, the term of this patent is extended or adjusted under 35 U.S.C. 154(b) by 292 days.

(21) Appl. No.: 16/845,509

(22) Filed: Apr. 10, 2020

(65) Prior Publication Data

US 2021/0200275 A1 Jul. 1, 2021

(30) Foreign Application Priority Data

Dec. 26, 2019 (TW) .................................. 108147949

(51) Int. Cl.
*G06F 1/16* (2006.01)
*E05D 3/14* (2006.01)

(52) U.S. Cl.
CPC .......... *G06F 1/1681* (2013.01); *G06F 1/1616* (2013.01); *E05D 3/14* (2013.01); *E05Y 2900/606* (2013.01)

(58) Field of Classification Search
CPC ....... G06F 1/1681; G06F 1/1616; E05D 3/14; E05Y 2900/606
See application file for complete search history.

(56) References Cited

U.S. PATENT DOCUMENTS

| | | | | |
|---|---|---|---|---|
| 6,223,393 B1 * | 5/2001 | Knopf | ................... | G06F 1/1618 16/386 |
| 9,047,055 B2 * | 6/2015 | Song | ..................... | G06F 1/1652 |
| 9,243,432 B2 * | 1/2016 | Lee | ......................... | G06F 1/1681 |
| 9,625,953 B2 * | 4/2017 | Bitz | ....................... | G06F 1/1681 |
| 9,915,086 B2 * | 3/2018 | Kato | ...................... | G06F 1/1681 |
| 10,088,875 B1 * | 10/2018 | Lin | .......................... | E05D 7/00 |
| 10,162,389 B2 * | 12/2018 | Tazbaz | .................. | H04M 1/022 |
| 10,401,917 B1 * | 9/2019 | Dai | ......................... | G06F 1/1681 |
| 10,437,293 B2 * | 10/2019 | Bitz | ......................... | E05D 1/04 |
| 10,858,869 B2 * | 12/2020 | Chiang | ..................... | E05D 3/06 |
| 10,890,951 B1 * | 1/2021 | Watamura | ........... | E05D 11/0054 |
| 11,153,982 B2 * | 10/2021 | Ho | .......................... | G06F 1/1681 |
| 11,181,951 B1 * | 11/2021 | Ushioda | ................ | G06F 1/1656 |

(Continued)

*Primary Examiner* — Victor D Batson
*Assistant Examiner* — Matthew J Sullivan
(74) *Attorney, Agent, or Firm* — Rosenberg, Klein & Lee

(57) ABSTRACT

A rotary shaft link assembly structure is connected between a first support and a second support of two articles. The rotary shaft link assembly structure has a rotary shaft assembly and at least one synchronous rotational assembly. The rotary shaft assembly has multiple connection members side-by-side disposed between the first and second supports. Each connection member is correspondingly formed with at least one hollow section. The synchronous rotational assembly passes through the hollow sections of the connection members to respectively connect with the first and second supports, whereby the connection members are transversely serially connected to drivingly bend and connect along with the synchronous rotational assembly. The connection members respectively shield a part of the synchronous rotational assembly to provide a protection effect and reduce the dropped powder and oil leakage caused by the friction.

20 Claims, 6 Drawing Sheets

(56) References Cited

U.S. PATENT DOCUMENTS

| | | | | |
|---|---|---|---|---|
| 2016/0090763 A1* | 3/2016 | Hsu | ............... | G06F 1/1681 |
| | | | | 16/354 |
| 2018/0066464 A1* | 3/2018 | Tazbaz | ............ | A45C 13/005 |
| 2018/0275725 A1* | 9/2018 | Lin | ............... | G06F 1/1616 |
| 2018/0341295 A1* | 11/2018 | Lan | ............... | G06F 1/1679 |
| 2019/0146559 A1* | 5/2019 | Chiang | ............ | G06F 1/1681 |
| | | | | 361/809 |
| 2020/0063476 A1* | 2/2020 | Lin | ............... | E05D 3/122 |
| 2020/0392983 A1* | 12/2020 | Chang | ............. | G06F 1/1681 |
| 2021/0037664 A1* | 2/2021 | Sun | ............... | H05K 5/0017 |
| 2021/0120688 A1* | 4/2021 | Wang | ............. | G06F 1/1652 |
| 2021/0199153 A1* | 7/2021 | Hsu | ............... | G06F 1/1681 |
| 2021/0200277 A1* | 7/2021 | Park | ............... | G06F 1/1618 |
| 2021/0207648 A1* | 7/2021 | Chen | .............. | G06F 1/1681 |
| 2021/0222729 A1* | 7/2021 | Hsu | ............... | E05D 7/00 |
| 2021/0307185 A1* | 9/2021 | Hong | ............. | G06F 1/1656 |
| 2021/0325941 A1* | 10/2021 | Hou | ............... | H04M 1/0216 |
| 2021/0365078 A1* | 11/2021 | Chen | .............. | E05D 11/10 |
| 2021/0400126 A1* | 12/2021 | Zhang | ............. | H04M 1/0268 |
| 2022/0019268 A1* | 1/2022 | Yu | ................ | G06F 1/1652 |
| 2022/0019270 A1* | 1/2022 | Su | ................ | G06F 1/1616 |

\* cited by examiner

ROTARY SHAFT LINK ASSEMBLY STRUCTURE

BACKGROUND OF THE INVENTION

1. Field of the Invention

The present invention relates generally to a rotary shaft link assembly structure, and more particularly to a rotary shaft link assembly structure, in which the rotary shaft assembly can partially shield the connection sections of the synchronous rotational assembly to provide a protection effect and reduce the dropped powder and oil leakage.

2. Description of the Related Art

There are various electronic devices provided with upper covers or display screens, (such as mobile phones, notebooks, PDA and electronic books). The upper covers or display screens are pivotally assembled on the electronic devices via pivot pins or rotary shafts, whereby the upper covers or the display screens can be reciprocally rotated and opened/closed under external force. For example, Taiwanese Patent No. 97222022 "rotary shaft structure" and Taiwanese Patent No. 98207366 "pivot pin structure" provide typical embodiments.

In order to use the rotatable section (such as the screen) of the electronic device in more operation modes to widen the application range thereof, a conventional dual-shaft mechanism disposed between two pivoted modules has been developed, whereby the two modules can be rotated by different angles in accordance with different operation modes. For example, Taiwanese Patent No. 99211350 "dual-shaft hinge device", Taiwanese Patent No. 99225737 "biaxial hinge device" and U.S. Pat. No. 7,512,426 B2 "mobile communications device with synchronizing hinge" provide preferred embodiments.

In the above conventional pivot shaft structure, in consideration of the strength of the supporting structure and the smoothness of the operation, generally two sets of rotary shafts are respectively disposed on two sides of the pivoted sections of the ends/edges of the display module and the apparatus body module of an electronic apparatus (such as a notebook). Therefore, when operating and turning open the display module or the apparatus body module, the coordination between the rotary shafts is not idealistic. Also, the rotational freeness of the pivot shaft units disposed near the same central line is limited. As a result, in both the opening and closing rotation process of the entire electronic apparatus, the smoothness of operation is poorer.

In order to improve the above shortcoming, a conventional technique provides a pivot shaft device employing multiple rotational centers. For example, Taiwanese Patent No. 101224879 "multi-segment rotary shaft structure" and Taiwanese Patent No. 101224880 "plug-type multi-segment rotary shaft structure" provide substantial embodiments. The above references employ active joint assembly and driven joint assembly assembled with each other. A middle link plate assembly is disposed between the two opposite joint plates of the active joint assembly. In addition, the two opposite joint plates are provided with synchronous driving section connected with the middle link plate assembly. The driven joint assembly has two driven plates disposed between the two opposite joint plates of the active joint assembly. A shaft pin is assembled with the inner ends of the opposite joint plates corresponding to the outer ends of the driven plates. A shaft pin is assembled with the outer end of the middle link plate assembly corresponding to the inner ends of the driven plates. Accordingly, multiple active joint assemblies and driven joint assemblies are side-by-side arranged to together form a multi-segment rotary shaft structure.

However, in practical application, when the two modules pivotally connected with each other are closed or opened, the connection sections of the respective rotary shaft assemblies will abrade each other to cause dropped powder and oil leakage. Moreover, in the structures of the conventional technique, the connection sections of the respective rotary shaft assemblies are directly exposed to outer side. As a result, in use, the dropped powder and leaking oil often directly contaminate the environment. This is a shortcoming in application.

It is therefore tried by the applicant to provide a rotary shaft link assembly structure, in which the rotary shaft assembly can partially shield the connection sections of the synchronous rotational assembly to provide a protection effect and reduce the dropped powder and oil leakage.

SUMMARY OF THE INVENTION

It is therefore a primary object of the present invention to provide a rotary shaft link assembly structure is connected between a first support and a second support of two articles. The rotary shaft link assembly structure has a rotary shaft assembly and at least one synchronous rotational assembly. The rotary shaft assembly has multiple connection members side-by-side arranged. Each connection member is formed with at least one hollow section in the sideward direction. The synchronous rotational assembly passes through the hollow sections of the connection members to respectively connect with the first and second supports, whereby the connection members are transversely serially connected to drivingly bend and connect along with the synchronous rotational assembly. The connection members respectively shield a part of the synchronous rotational assembly to provide a protection effect and reduce the dropped powder and oil leakage caused by the friction when the synchronous rotational assembly is rotated.

It is a further object of the present invention to provide the above rotary shaft link assembly structure, in which the synchronous rotational assembly is at least composed of a pivot shaft assembly and a toothed ring assembly. The pivot shaft assembly has multiple pivot shafts side-by-side arranged. The toothed ring assembly has multiple toothed rings engaged with each other. The toothed rings are respectively pivotally connected with two adjacent pivot shafts. The toothed rings are engaged to connect the respective pivot shafts, whereby when the pivot shafts are forced, the first and second supports are pivotally rotated in reverse directions by the same angle so that the first and second supports can be smoothly and synchronously rotated.

To achieve the above and other objects, the rotary shaft link assembly structure of the present invention includes: a first support connected with a first article; a second support connected with a second article; a rotary shaft assembly having multiple connection members, the connection members being side-by-side serially connected between the first and second supports, each connection member being correspondingly formed with at least one hollow section; and a synchronous rotational assembly, which can be forcedly bent, the synchronous rotational assembly passing through the hollow sections of the respective connection members, the synchronous rotational assembly being respectively connected with the first and second supports, whereby the connection members are transversely serially connected and the connection members can respectively shield a part of the synchronous rotational assembly.

In the above rotary shaft link assembly structure, the rotary shaft assembly further has multiple spacer shaft rods. The spacer shaft rods are respectively serially disposed between the connection members. Each connection member has two arched channels respectively formed on two sides of an opening of the hollow section corresponding to the spacer shaft rod. The spacer shaft rods are held by the arched channels.

In the above rotary shaft link assembly structure, the spacer shaft rods are cylindrical bodies.

In the above rotary shaft link assembly structure, the synchronous rotational assembly is at least composed of a pivot shaft assembly and a toothed ring assembly. The pivot shaft assembly has multiple pivot shafts side-by-side arranged. The toothed ring assembly has multiple toothed rings partially engaged with each other. Each toothed ring is formed with at least one shaft hole in which an adjacent pivot shaft is pivotally fitted, whereby the toothed rings are sequentially engaged to connect the respective pivot shafts.

In the above rotary shaft link assembly structure, an elastic deformation section is disposed on one side of at least some of the shaft holes to permit elastic expansion.

In the above rotary shaft link assembly structure, the elastic deformation section is a split outward extending from one side of the shaft hole.

In the above rotary shaft link assembly structure, the elastic deformation section is a stop section protruding from a periphery of the shaft hole.

In the above rotary shaft link assembly structure, the synchronous rotational assembly has a connection seat and a connection component connected with two sides of the toothed ring assembly. The connection seat is securely connected on the first support (or the second support), the connection component being securely connected on the second support (or the first support).

The present invention can be best understood through the following description and accompanying drawings, wherein:

DETAILED DESCRIPTION OF THE PREFERRED EMBODIMENTS

Figure 1:
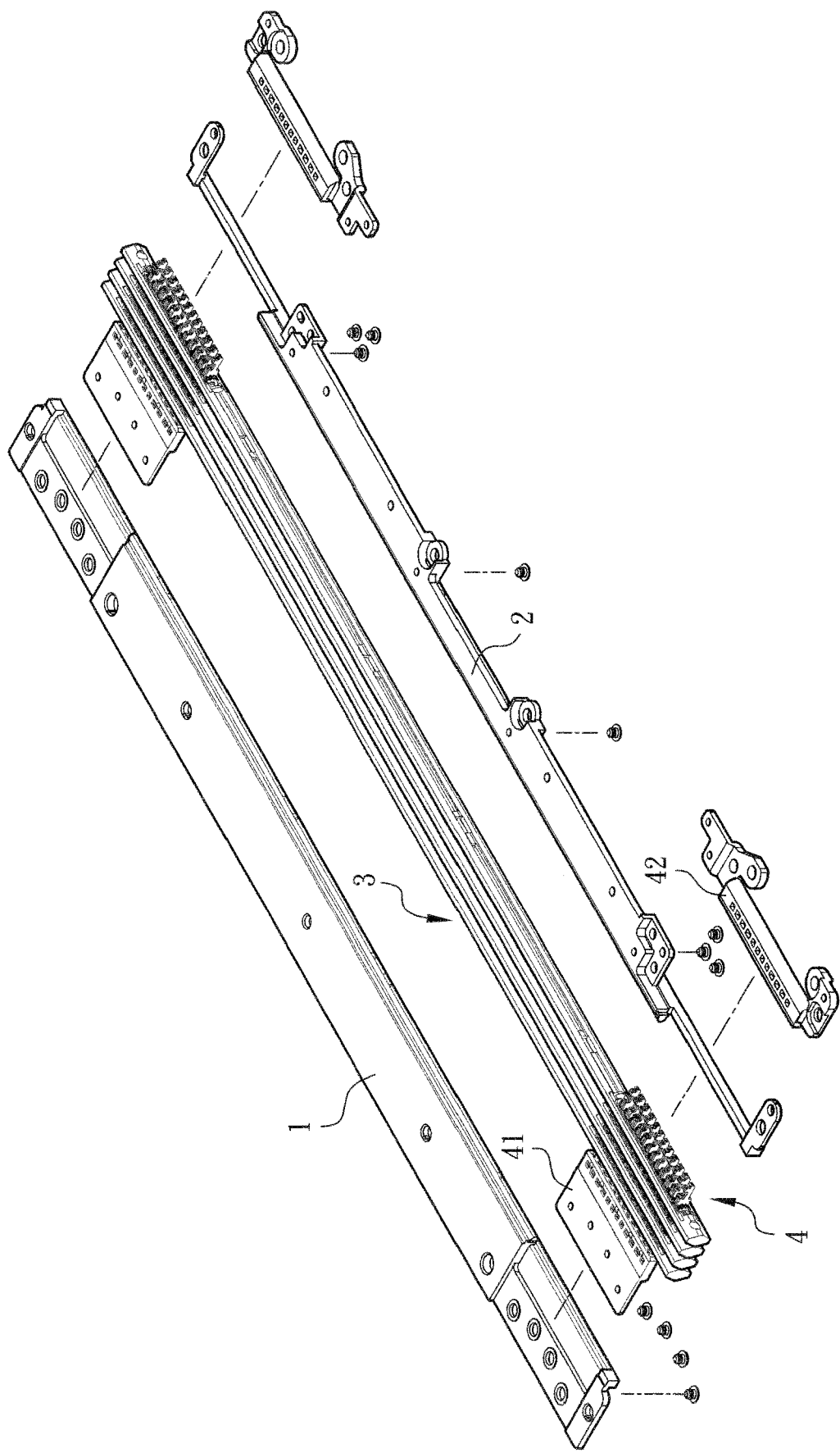
FIG. 1 is a perspective exploded view of the present invention.
Figure 2:
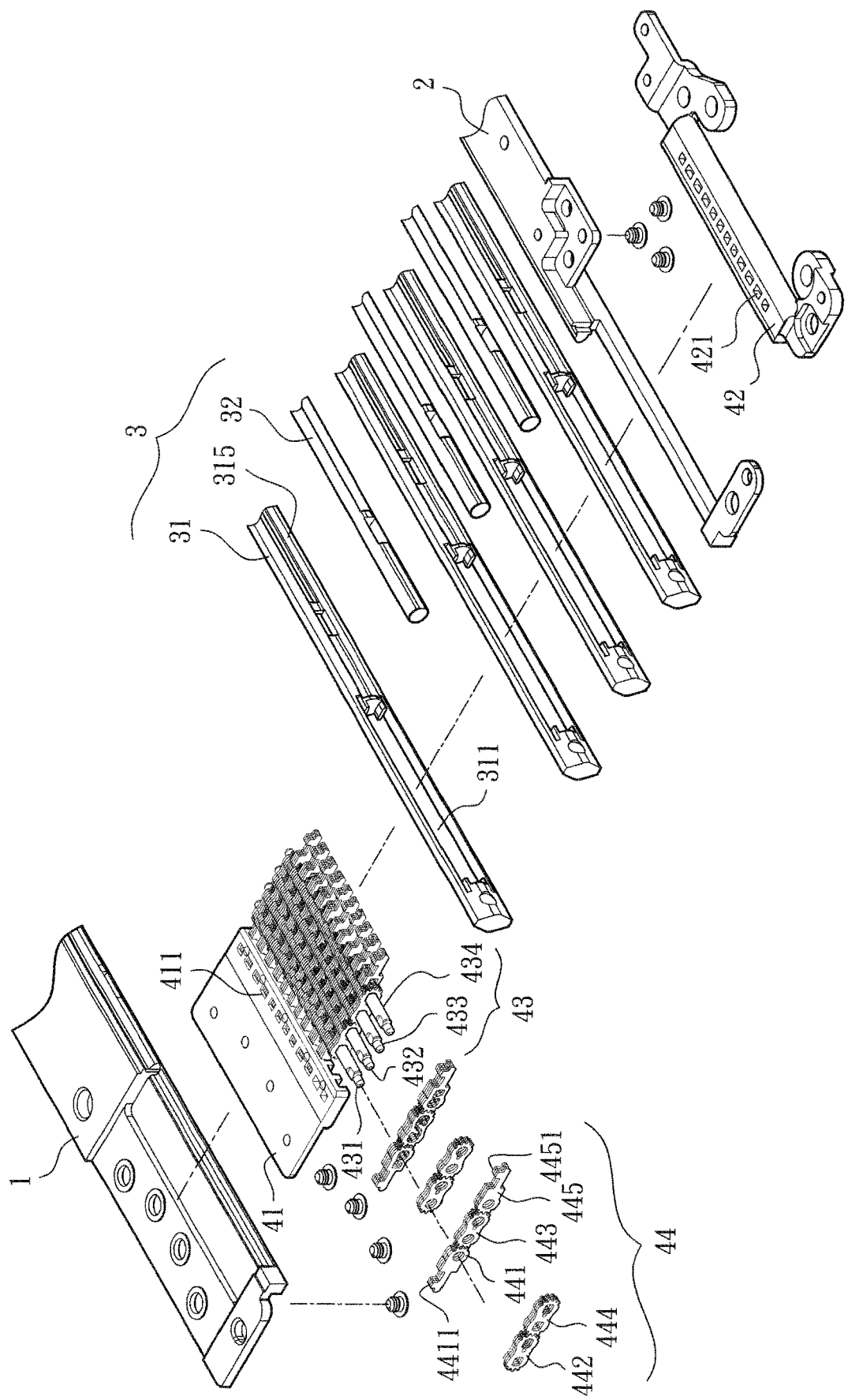
FIG. 2 is a perspective partially exploded view of the present invention.
Figure 3:
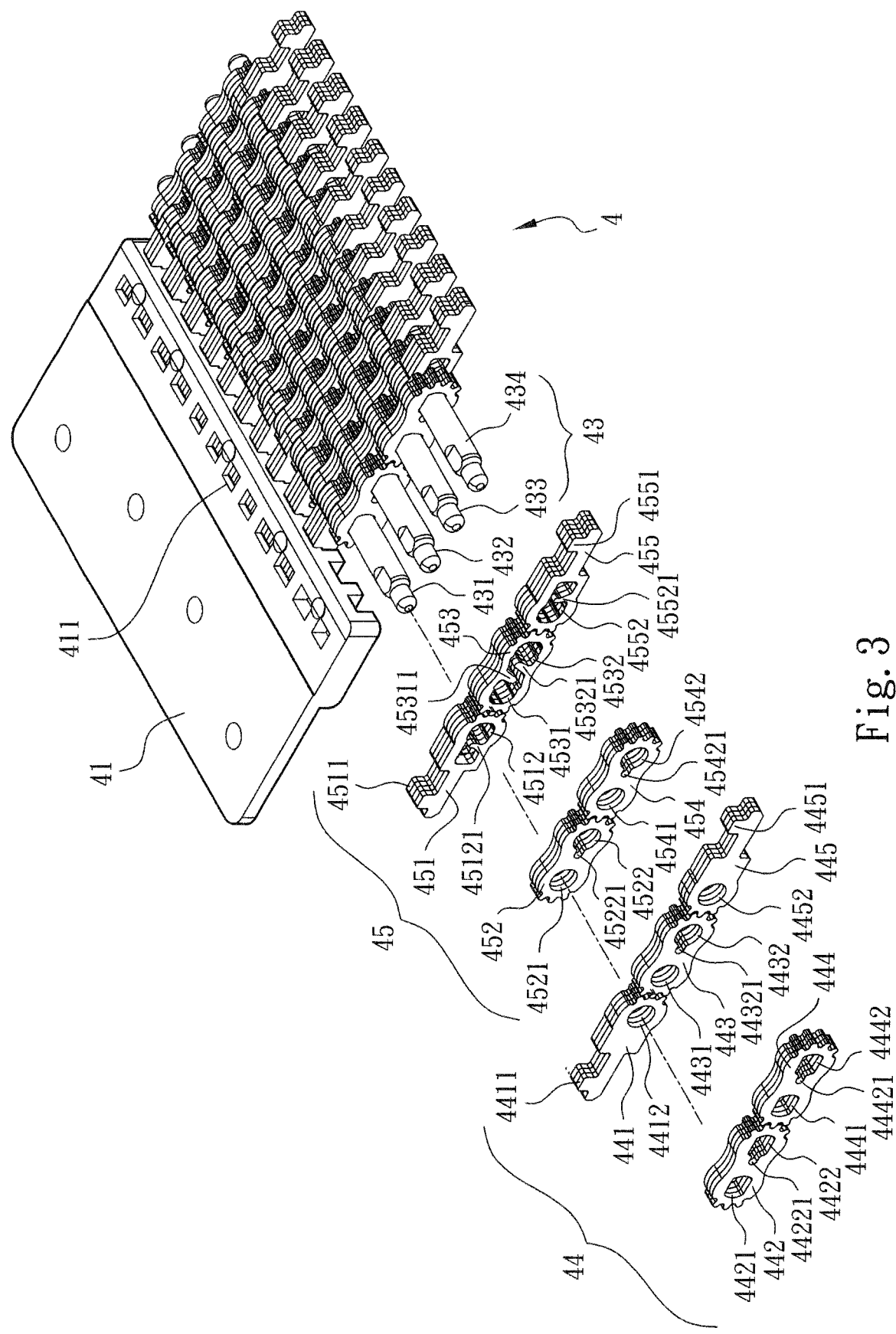
FIG. 3 is a partially exploded enlarged view of the synchronous rotational assembly of the present invention.
Figure 4:
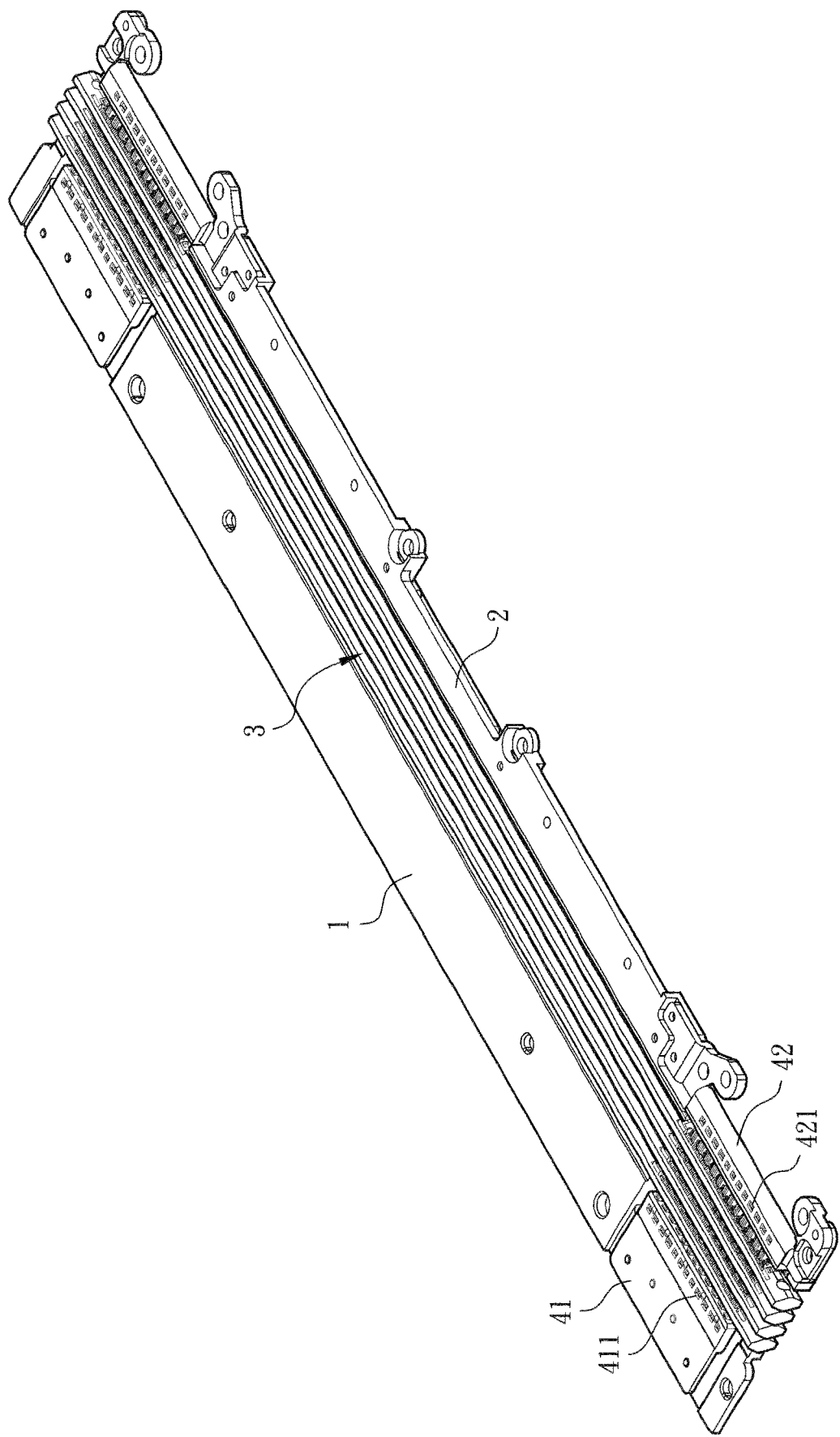
FIG. 4 is a perspective completely assembled view of the present invention.

Please refer to FIGS. 1 to 4. The rotary shaft link assembly structure of the present invention includes a first support 1, a second support 2, a rotary shaft assembly 3 and a synchronous rotational assembly 4. The first support 1 is connected with a first article (not shown, can be a section of an electronic device). The second support 2 is connected with a second article (not shown, can be another section of the electronic device).

The rotary shaft assembly 3 is composed of multiple connection members 31 and multiple spacer shaft rods 32. The connection members 31 are side-by-side arranged between the first and second supports 1, 2. Each connection member 31 is correspondingly formed with at least one hollow section 311. Each connection member 31 has two arched channels 315 respectively formed on two sides of the opening of the hollow section 311.

The spacer shaft rods 32 are respectively attached to and sandwiched between the connection members 31. In a preferred embodiment, the spacer shaft rods 32 are cylindrical bodies. Two lateral sides of the spacer shaft rods 32 are respectively held by the arched channels 315 of the adjacent connection members 31, whereby by means of the spacer shaft rods 32, the connection members 31 can smoothly rotate and displace.

The synchronous rotational assembly 4 passes through the hollow sections 311 of the connection members 31. Two sides of the synchronous rotational assembly 4 are respectively connected with the first and second supports 1, 2, whereby the connection members 31 are transversely serially connected. The connection members 31 can respectively shield a part of the synchronous rotational assembly 4. The synchronous rotational assembly 4 is composed of a connection seat 41, a connection component 42, a pivot shaft assembly 43 and a toothed ring assembly 44. One side of the connection seat 41 is connected with the first support 1. One side of the connection component 42 is connected with the second support 2.

The pivot shaft assembly 43 is composed of multiple pivot shafts side-by-side arranged between the first and second supports 1, 2. The toothed ring assembly 44 has multiple toothed rings partially engaged with each other. Each toothed ring is pivotally fitted on two adjacent pivot shafts, whereby the toothed rings are sequentially engaged to connect the respective pivot shafts.

In this embodiment, one side of the connection seat 41 distal from the first support 1 is formed with multiple sockets 411 and one side of the connection component 42 distal from the second support 2 is formed with multiple sockets 421. The pivot shaft assembly 43 has a first pivot shaft 431, a second pivot shaft 432, a third pivot shaft 433 and a fourth pivot shaft 434, which are side-by-side arranged. The toothed ring assembly 44 has a first toothed ring 441, a second toothed ring 442, a third toothed ring 443, a fourth toothed ring 444 and a fifth toothed ring 445, which are partially engaged with each other. The first, third and fifth toothed rings 441, 443, 445 are sequentially engaged with each other. A raised section 4411 is disposed on one side of the first toothed ring 441, which is securely connected in the socket 411 of the connection seat 41. The first toothed ring 441 is formed with a shaft hole 4412 in which the first pivot shaft 431 is fitted. A raised section 4451 is disposed on one side of the fifth toothed ring 445, which is securely connected in the socket 421 of the connection component 42. The fifth toothed ring 445 is formed with a shaft hole 4452 in which the fourth pivot shaft 434 is fitted. The third toothed ring 443 is engaged between the first and fifth toothed rings 441, 445. The third toothed ring 443 is formed with two shaft holes 4431, 4432 in which the second and third pivot shafts 432, 433 are respectively fitted. An elastic deformation section 44321, (which can be an outward extending split) is disposed on one side of the shaft hole 4432 (or the shaft hole 4431) to permit elastic expansion. The second and fourth toothed rings 442, 444 are engaged with each other. The second toothed ring 442 is formed with two shaft holes 4421, 4422 in which the first and second pivot shafts 431, 432 are respectively fitted. An elastic deformation section 44221, (which can be an outward extending split) is disposed on one side of the shaft hole 4422 (or the shaft hole 4421) to permit elastic expansion. The fourth toothed ring 444 is formed with two shaft holes 4441, 4442 in which the third and fourth pivot shafts 433, 434 are respectively fitted. An elastic deformation section 44421, (which can be an outward extending split) is disposed on one side of the shaft hole 4442 (or the shaft hole 4441) to permit elastic expansion.

By means of the first, second, third, fourth and fifth toothed rings 441, 442, 443, 444, 445, the first, second, third and fourth pivot shafts 431, 432, 433, 434 are synchronously rotatably connected with each other.

In a preferred embodiment, the synchronous rotational assembly 4 further includes a different toothed ring assembly 45. The toothed ring assembly 45 is composed of a first toothed ring 451, a second toothed ring 452, a third toothed ring 453, a fourth toothed ring 454 and a fifth toothed ring 455, which are engaged with each other in the same connection relationship as the first, second, third, fourth and fifth toothed rings 441, 442, 443, 444, 445. A raised section 4511 is disposed on one side of the first toothed ring 451, which is securely connected in the socket 411 of the connection seat 41. A raised section 4551 is disposed on one side of the fifth toothed ring 455, which is securely connected in the socket 421 of the connection component 42. The first toothed ring 451 is formed with a shaft hole 4512 in which the first pivot shaft 431 is fitted. The fifth toothed ring 455 is formed with a shaft hole 4552 in which the fourth pivot shaft 434 is fitted. An elastic deformation section 45121, (which can be a stop section protruding from a periphery of the shaft hole 4512) is disposed on one side of the shaft hole 4512 to permit elastic expansion. An elastic deformation section 45521, (which can be a stop section protruding from a periphery of the shaft hole 4552) is disposed on one side of the shaft hole 4552 to permit elastic expansion. The third toothed ring 453 is formed with two shaft holes 4531, 4532 in which the second and third pivot shafts 432, 433 are respectively fitted. An elastic deformation section 45311, 45321, (which can be a stop section protruding from a periphery of the shaft hole 4531, 4532) is disposed on one side of each of the shaft holes 4531, 4532 to permit elastic expansion. The second toothed ring 452 is formed with two shaft holes 4521, 4522 in which the first and second pivot shafts 431, 432 are respectively fitted. An elastic deformation section 45221, (which can be an outward extending split) is disposed on one side of the shaft hole 4522 (or the shaft hole 4521) to permit elastic expansion. The fourth toothed ring 454 is formed with two shaft holes 4541, 4542 in which the third and fourth pivot shafts 433, 434 are respectively fitted. An elastic deformation section 45421, (which can be an outward extending split) is disposed on one side of the shaft hole 4542 (or the shaft hole 4541) to permit elastic expansion.

Figure 5:
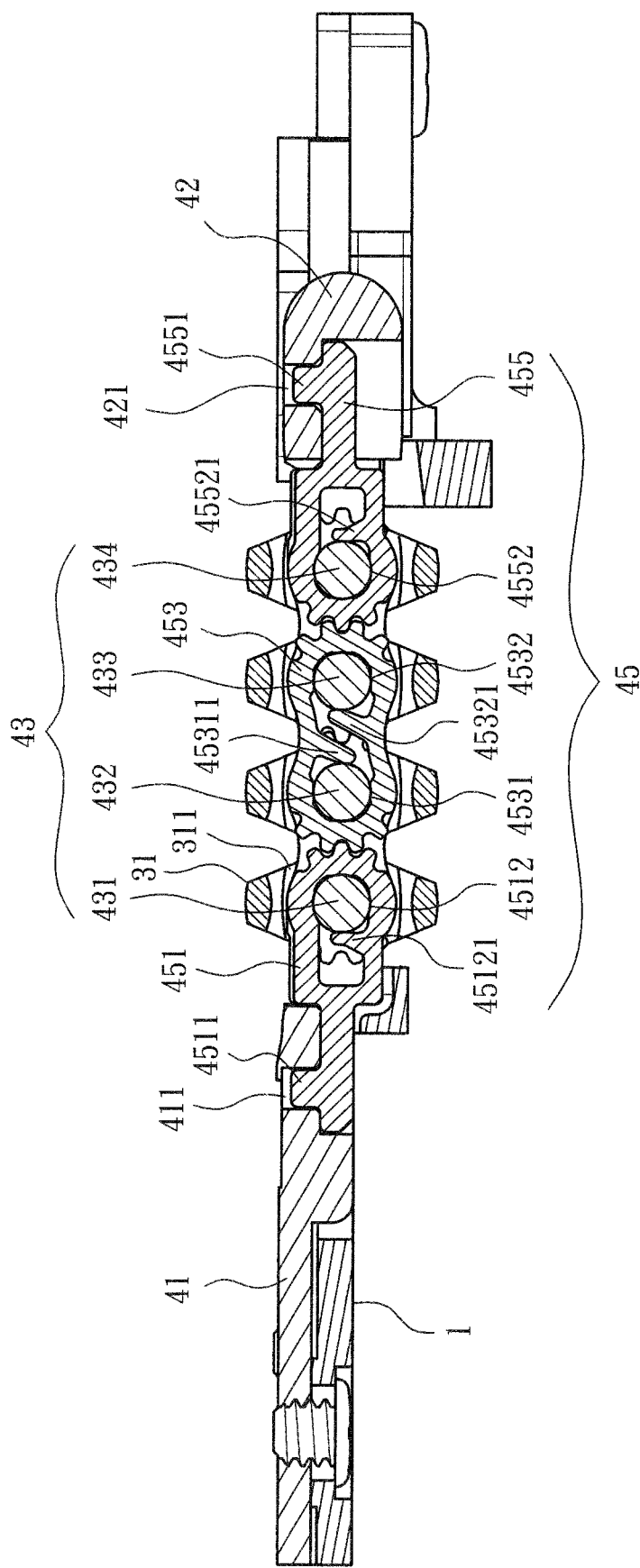
FIG. 5 is a side sectional completely assembled view of the present invention.
Figure 6:
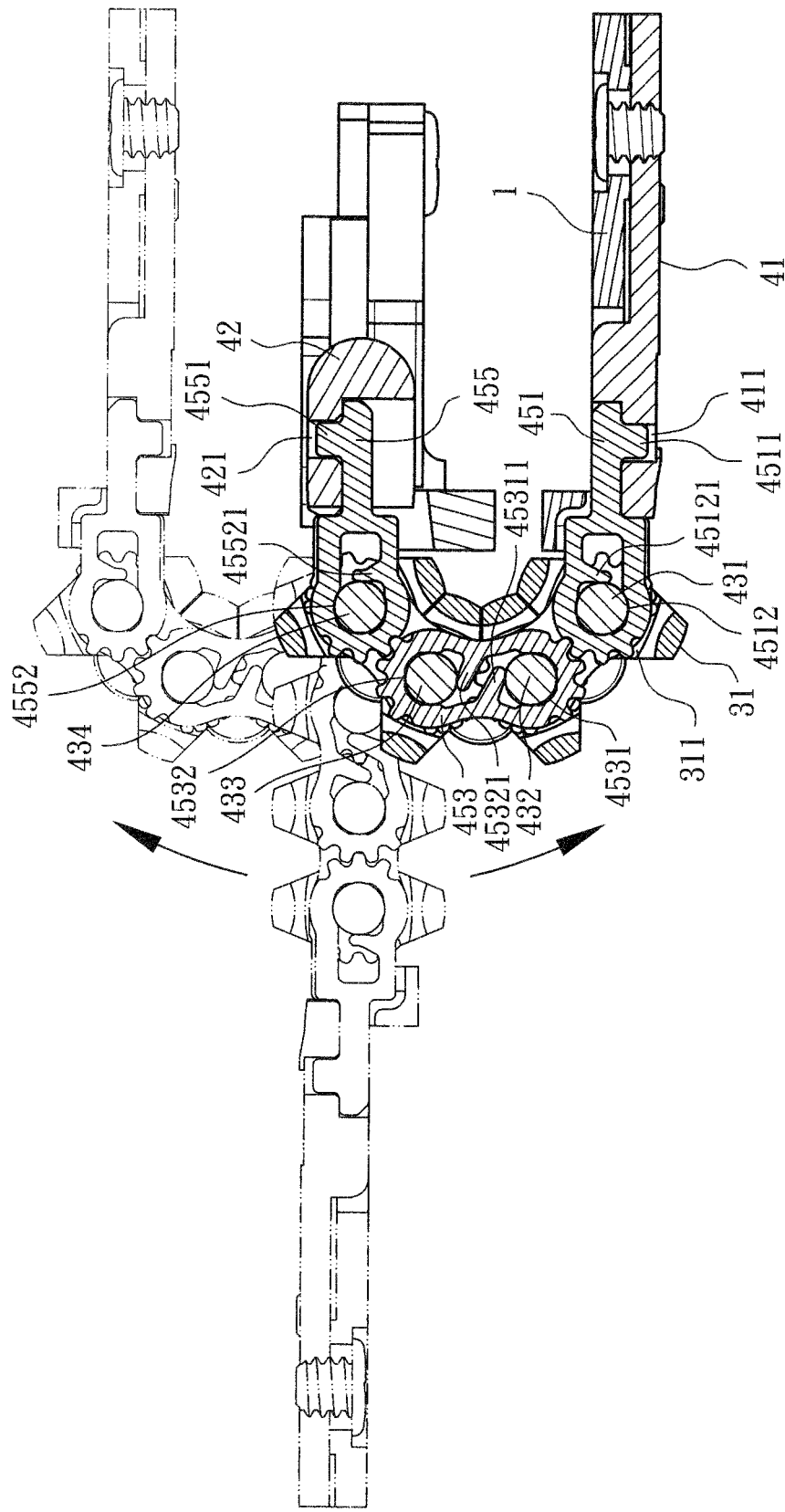
FIG. 6 is a sectional view showing the bending of the present invention.

Please refer to FIGS. 5 and 6. In use of the rotary shaft link assembly structure of the present invention, when the first and second supports 1, 2 are respectively forced and rotated, the force is transmitted to the toothed ring assembly 44 (or the toothed ring assembly 45) via the connection seat 41 and the connection component 42. Accordingly, the first, second, third and fourth pivot shafts 431, 432, 433, 434 of the pivot shaft assembly 43 can be synchronously forward/backward pivotally rotated and displaced via the first, second, third, fourth and fifth toothed rings 441, 442, 443, 444, 445 (or the first, second, third, fourth and fifth toothed rings 451, 452, 453, 454, 455, whereby the first and second articles can be opened/closed relative to each other.

During the pivotal rotation and displacement of the first, second, third and fourth pivot shafts 431, 432, 433, 434, by means of the elastic deformation sections 44221, 44321, 44421 (or the elastic deformation sections 45121, 45221, 45311, 45321, 45421, 45521), the position deflection caused by the processing precision error or other factors of the respective components of the pivot shaft assembly 43 and the toothed ring assembly 44 can be effectively absorbed. Accordingly, the synchronous rotational assembly 4 can smoothly drive the multiple connection members 31 of the rotary shaft assembly 3 to bend and connect between the respective spacer shaft rods 32. Also, the connection members 31 can respectively shield a part of the synchronous rotational assembly 4 to not only provide a protection effect but also reduce the dropped powder and oil leakage caused by the friction of the synchronous rotational assembly 4.

In practical application of the rotary shaft link assembly structure of the present invention, as necessary, a flexible shielding plate can be disposed in the hollow section 311 of each connection member 31. Alternatively, at least the sections of the adjacent connection members 31 near the hollow sections 311 are designed with partially overlapping structures, whereby when the synchronous rotational assembly 4 is forward/backward bent, the synchronous rotational assembly 4 can keep fully shielded by the shielding plates or the connection members 31.

In conclusion, the rotary shaft link assembly structure of the present invention can truly partially shield the connection sections of the synchronous rotational assembly so as to provide a protection effect and reduce the dropped powder and oil leakage. The rotary shaft link assembly structure of the present invention is inventive and advanced.

The above embodiments are only used to illustrate the present invention, not intended to limit the scope thereof. Many modifications of the above embodiments can be made without departing from the spirit of the present invention.

What is claimed is:

1. A rotary shaft link assembly structure comprising:
   a first support connected with a first article;
   a second support connected with a second article;
   a rotary shaft assembly having multiple substantially identically shaped connection members, the connection members being side-by-side serially connected between the first and second supports, each connection member being correspondingly formed with at least one elongated hollow section extending continuously along said each connection member; and
   an elastic clamping synchronous rotational assembly, the elastic clamping synchronous rotational assembly passing through the elongated hollow sections of the respective connection members, the elastic clamping synchronous rotational assembly being respectively connected with the first and second supports, whereby the connection members are transversely serially connected and respectively shield a part of the elastic clamping synchronous rotational assembly.

2. The rotary shaft link assembly structure as claimed in claim 1, wherein the rotary shaft assembly further has multiple spacer shaft rods, the plurality of spacer shaft rods are respectively serially disposed between the connection members, each connection member having two arched channels respectively formed on two sides of an opening of the elongated hollow section corresponding to the spacer shaft rod, the spacer shaft rods being held by the arched channels.

3. The rotary shaft link assembly structure as claimed in claim 2, wherein the spacer shaft rods are cylindrical bodies.

4. A rotary shaft link assembly structure, comprising:
a first support connected with a first article;
a second support connected with a second article;
a rotary shaft assembly having multiple connection members, the connection members being side-by-side serially connected between the first and second supports, each connection member being correspondingly formed with at least one hollow section; and
an elastic clamping synchronous rotational assembly, the elastic clamping synchronous rotational assembly passing through the hollow sections of the respective connection members, the elastic clamping synchronous rotational assembly being respectively connected with the first and second supports, whereby the connection members are transversely serially connected and respectively shield a part of the elastic clamping synchronous rotational assembly, wherein the elastic clamping synchronous rotational assembly includes a pivot shaft assembly and a toothed ring assembly, the pivot shaft assembly having multiple pivot shafts arranged side-by-side, the toothed ring assembly having multiple toothed rings partially engaged with each other, each toothed ring being formed with at least one shaft hole in which an adjacent pivot shaft is pivotally fitted, whereby the toothed rings are sequentially engaged to connect the respective pivot shafts.

5. The rotary shaft link assembly structure as claimed in claim 2, wherein the elastic clamping synchronous rotational assembly includes a pivot shaft assembly and a toothed ring assembly, the pivot shaft assembly having multiple pivot shafts side-by-side arranged, the toothed ring assembly having multiple toothed rings partially engaged with each other, each toothed ring being formed with at least one shaft hole in which an adjacent pivot shaft is pivotally fitted, whereby the toothed rings are sequentially engaged to connect the respective pivot shafts.

6. The rotary shaft link assembly structure as claimed in claim 3, wherein the elastic clamping synchronous rotational assembly includes a pivot shaft assembly and a toothed ring assembly, the pivot shaft assembly having multiple pivot shafts side-by-side arranged, the toothed ring assembly having multiple toothed rings partially engaged with each other, each toothed ring being formed with at least one shaft hole in which an adjacent pivot shaft is pivotally fitted, whereby the toothed rings are sequentially engaged to connect the respective pivot shafts.

7. The rotary shaft link assembly structure as claimed in claim 4, wherein an elastic deformation section is disposed on one side of respective ones of the shaft holes to permit elastic expansion.

8. The rotary shaft link assembly structure as claimed in claim 5, wherein an elastic deformation section is disposed on one side of respective ones of the shaft holes to permit elastic expansion.

9. The rotary shaft link assembly structure as claimed in claim 6, wherein an elastic deformation section is disposed on one side of respective ones of the shaft holes to permit elastic expansion.

10. The rotary shaft link assembly structure as claimed in claim 7, wherein the elastic deformation section is a split outward extending from one side of the shaft hole.

11. The rotary shaft link assembly structure as claimed in claim 8, wherein the elastic deformation section is a split outward extending from one side of the shaft hole.

12. The rotary shaft link assembly structure as claimed in claim 9, wherein the elastic deformation section is a split outward extending from one side of the shaft hole.

13. The rotary shaft link assembly structure as claimed in claim 7, wherein the elastic deformation section is a stop section protruding from a periphery of the shaft hole.

14. The rotary shaft link assembly structure as claimed in claim 8, wherein the elastic deformation section is a stop section protruding from a periphery of the shaft hole.

15. The rotary shaft link assembly structure as claimed in claim 9, wherein the elastic deformation section is a stop section protruding from a periphery of the shaft hole.

16. The rotary shaft link assembly structure as claimed in claim 4, wherein the elastic clamping synchronous rotational assembly has a connection seat and a connection component connected with two sides of the toothed ring assembly, the connection seat being securely connected on the first support, the connection component being securely connected on the second support.

17. The rotary shaft link assembly structure as claimed in claim 5, wherein the elastic clamping synchronous rotational assembly has a connection seat and a connection component connected with two sides of the toothed ring assembly, the connection seat being securely connected on the first support, the connection component being securely connected on the second support.

18. The rotary shaft link assembly structure as claimed in claim 6, wherein the elastic clamping synchronous rotational assembly has a connection seat and a connection component connected with two sides of the toothed ring assembly, the connection seat being securely connected on the first support, the connection component being securely connected on the second support.

19. The rotary shaft link assembly structure as claimed in claim 7, wherein the elastic clamping synchronous rotational assembly has a connection seat and a connection component connected with two sides of the toothed ring assembly, the connection seat being securely connected on the first support, the connection component being securely connected on the second support.

20. The rotary shaft link assembly structure as claimed in claim 8, wherein the elastic clamping synchronous rotational assembly has a connection seat and a connection component connected with two sides of the toothed ring assembly, the connection seat being securely connected on the first support, the connection component being securely connected on the second support.

* * * * *